United States Patent
Murakami

(10) Patent No.: US 10,620,080 B2
(45) Date of Patent: Apr. 14, 2020

(54) WATER LEAKAGE DETECTION SYSTEM

(71) Applicant: DENSO WAVE INCORPORATED, Chiga-gun, Aichi-pref (JP)

(72) Inventor: Yotaro Murakami, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 87 days.

(21) Appl. No.: 15/799,658

(22) Filed: Oct. 31, 2017

(65) Prior Publication Data

US 2018/0128706 A1    May 10, 2018

(30) Foreign Application Priority Data

Nov. 4, 2016 (JP) .................. 2016-216231

(51) Int. Cl.
*G01M 3/28* (2006.01)
*G01M 3/30* (2006.01)

(52) U.S. Cl.
CPC ............ *G01M 3/2807* (2013.01); *G01M 3/28* (2013.01); *G01M 3/2846* (2013.01); *G01M 3/2876* (2013.01); *G01M 3/30* (2013.01)

(58) Field of Classification Search
CPC .... G01M 3/28; G01M 3/2807; G01M 3/2876; G01M 3/2846; G01M 3/30
See application file for complete search history.

(56) References Cited

U.S. PATENT DOCUMENTS

| | | | |
|---|---|---|---|
| 2003/0146402 A1* | 8/2003 | Hirota | F16K 1/123 251/129.08 |
| 2007/0215826 A1* | 9/2007 | Katoh | F16K 31/0658 251/129.04 |
| 2011/0146805 A1* | 6/2011 | Foster | E03B 7/071 137/2 |

FOREIGN PATENT DOCUMENTS

| | | |
|---|---|---|
| JP | H08-29830 A | 2/1996 |
| JP | 3725693 B2 | 12/2005 |
| WO | 2007/024894 A2 | 3/2007 |

* cited by examiner

*Primary Examiner* — Paul M. West
(74) *Attorney, Agent, or Firm* — Oliff PLC

(57) ABSTRACT

A water leakage detection system includes: a solenoid valve that is provided to a water pipe having at least one feed-water valve on a downstream portion of the water pipe, and is configured to be set to at least one stage of a partially-opened state between a fully-closed state and a fully-opened state; a flow meter that is disposed on a downstream side of the solenoid valve; and a controller that controls an opening/closing state of the solenoid valve, and receives information on a flow rate detected by the flow meter. The controller detects water leakage in the water pipe when the solenoid valve is turned to the fully-closed state, and thereafter when the solenoid valve is set to the partially-opened state at a time point when a predetermined time elapses, and thereafter when the flow meter detects a flow rate.

11 Claims, 6 Drawing Sheets

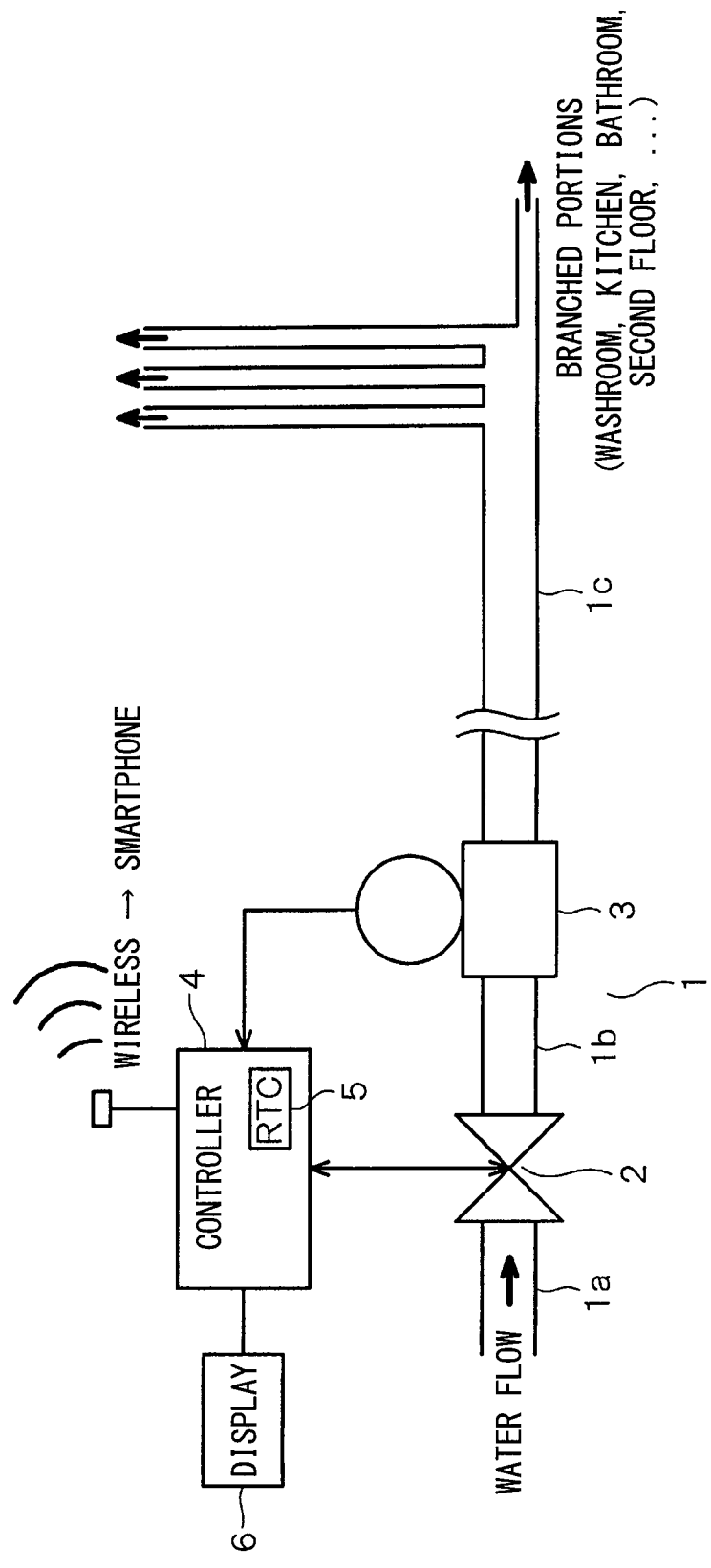

WATER LEAKAGE DETECTION SYSTEM

CROSS REFERENCE TO RELATED APPLICATIONS

This application is based on Japanese Patent Application No. 2016-216231 filed on Nov. 4, 2016, the disclosure of which is incorporated herein by reference.

TECHNICAL FIELD

The present disclosure relates to a system that detects water leakage in a water pipe.

BACKGROUND ART

Patent Literature 1: JP 3725693 B1
Patent Literature 2: WO 2007/024894 A

Various types of techniques for detecting water leakage in water pipes have been proposed. In recent years, waterworks as infrastructure are getting older on a nationwide basis. Therefore, in view of prevention of unnecessary water consumption and damage to buildings, it may be preferable to detect water leakage at a minute level and take measures promptly.

SUMMARY

The conventional techniques for water leakage detection may not detect water leakage at a minute level. Therefore, while it may be possible to respond to such a demand to some extent by using a highly accurate flow meter, for example, this may necessarily increase costs.

It is an object of the present disclosure to provide a water leakage detection system capable of detecting water leakage at a minute level, without using a flow meter with high accuracy.

According to one aspect of the present disclosure, a water leakage detection system includes a solenoid valve, a flow meter, and a controller. The solenoid valve is provided to a water pipe having at least one feed-water valve on a downstream portion of the water pipe, and is configured to be set to at least one stage of a partially-opened state between a fully-closed state and a fully-opened state. The flow meter is disposed on a downstream side of the solenoid valve. The controller controls an opening/closing state of the solenoid valve, and receives information on a flow rate detected by the flow meter. The controller detects water leakage in the water pipe when the solenoid valve is turned to the fully-closed state, and thereafter when the solenoid valve is set to the partially-opened state at a time point when a predetermined time elapses, and thereafter when the flow meter detects a flow rate.

According to the water leakage detection system, when the solenoid valve is set to the partially-opened state, the flow meter only has to detect a flow rate produced according to a difference in water pressure between upstream and downstream, and no expensive high-accuracy flow meter is required. Therefore, it may be possible to configure a system capable of detecting water leakage at a minute level at low costs. By setting the solenoid valve to the partially-opened state whose opening area is smaller than that in the fully-opened state as described above, a high rate of flow may be produced even with a small difference in water pressure. It may be possible that the common flow meter to detect a flow rate, that is, water leakage.

BRIEF DESCRIPTION OF DRAWINGS

The above and other objects, features and advantages of the present disclosure will become more apparent from the following detailed description made with reference to the accompanying drawings. In the drawings:

FIG. 1 is a block diagram illustrating a configuration of a water leakage detection system according to a first embodiment;

DETAILED DESCRIPTION

First Embodiment

Figure 2A:
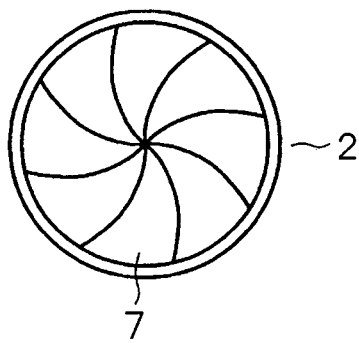
FIG. 2A is a diagram illustrating one example of shut-off valves that constitute a solenoid valve.

Hereinafter, a first embodiment will be described with reference to FIG. 1 through FIG. 6. FIG. 1 is a block diagram illustrating a configuration of a water leakage detection system. A water pipe 1 is provided in order to supply water to a standard home, for example, and a solenoid valve 2 and a flow meter 3 are disposed in middle of the water pipe 1. Here, a portion of the water pipe that is on the upstream side, that is, on the side of a water source, from the solenoid valve 2 is indicated by 1a. A portion of the water pipe between the solenoid valve 2 and the flow meter 3 is indicated by 1b. A portion of the water pipe on the downstream side, that is, on the side of a home, from the flow meter 3 is indicated by 1c. The downstream side of the water pipe 1c is branched into multiple pipes for supplying water to various areas in the home such as a washroom, a kitchen, and a bathroom. When water is not used, each of end portions of the water pipe 1c is blocked by a feed-water valve such as a faucet 8 illustrated in FIG. 4, for example.

The solenoid valve 2 may be set to at least one or more stages of a partially-opened state between a fully-closed state and a fully-opened state. A configuration of the solenoid valve 2 will be described later in detail. A degree of opening of the solenoid valve 2 is adjusted by a controller 4. The controller 4 is configured by a microcomputer, for example, and includes a real-time clock (RTC), that is, an RTC 5 having a clock function, in order to obtain time information. The flow meter 3 does not output any signal when a quantity of water flow within the water pipe 1 is "0", and when a flow rate is detected, the flow meter 3 outputs pulse signals at intervals corresponding to the rate of flow.

The flow meter 3 may be attached to a flow rate meter provided to check water usage.

The pulse signals generated by the flow meter 3 are input to the controller 4. Further, the controller 4 monitors a status of the water pipe 1, based on input of an opening state and the degree of opening of the solenoid valve 2 controlled by the controller 4. Moreover, a display device 6 is connected to the controller 4. The display device 6 is installed on a wall within a house or the like, and status information or the like of the water pipe 1 grasped by the controller 4 are displayed on the display device 6 by symbols and text messages.

Further, the controller 4 has a wireless communication function, and transmits information displayed in the display device 6 in a smartphone or the like carried by a user to notify the user of the information. Providing only one of the display device 6 and the information notification function by wireless communication may be sufficient. Any of these components may be powered by a battery, or supplied by a power source circuit connected to a utility AC power source, as a driving power source.

Figure 2B:
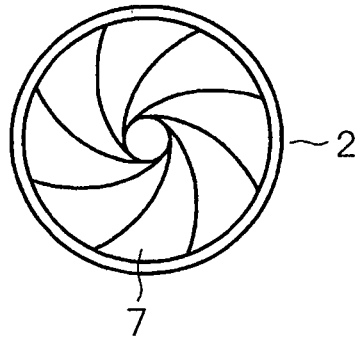
FIG. 2B is a diagram illustrating one example of the shut-off valves that constitute a solenoid valve.
Figure 2C:
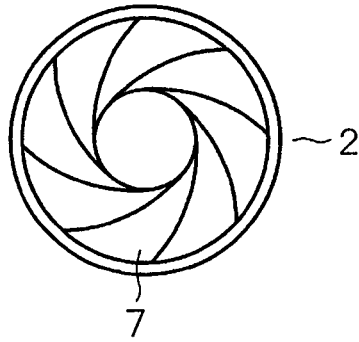
FIG. 2C is a diagram illustrating one example of the shut-off valves that constitute a solenoid valve.
Figure 2D:
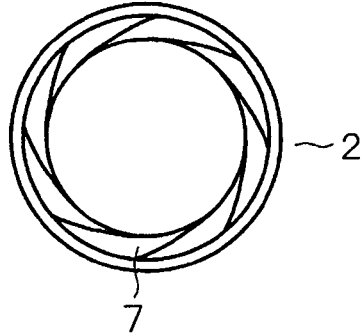
FIG. 2D is a diagram illustrating one example of the shut-off valves that constitute a solenoid valve.
Figure 2E:
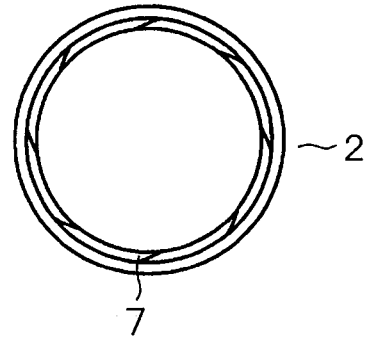
FIG. 2E is a diagram illustrating one example of the shut-off valves that constitute a solenoid valve.

FIG. 2A to FIG. 2E shows one example of shut-off valves 7 that constitute the solenoid valve 2. FIG. 2A illustrates a state of shut-off valves 7 in fully closed state. FIG. 2B illustrates a state of shut-off valves 7 in a first partially opened state. FIG. 2C illustrates a state of shut-off valves 7 in a second partially opened state. FIG. 2D illustrates a state of shut-off valves 7 in a third partially opened state. FIG. 2E illustrates a state of shut-off valves 7 in a fully opened state. In order to detect water leakage at a minute level, it may be preferable that the solenoid valve 2 used for the water leakage detection system of the present embodiment may be set to a state in which the valve is slightly opened from a fully-closed state. Further, as the rate of flow within the water pipe 1 is highest at a radially central portion of the water pipe 1, it may be preferable that the shut-off valves 7 start to open from the radially central portion of the water pipe 1. Therefore, for the solenoid valve 2, similarly to a throttle mechanism having multiple throttle blades for a lens shutter of a camera, for example, a configuration is employed in which a flow channel within the water pipe 1 is blocked such that an opening is narrowed by moving multiple shut-off valves 7 from a peripheral portion toward a central portion. In the example of the configuration illustrated in FIG. 2A to FIG. 2E, the number of the shut-off valves 7 is eight. As reference, JP H08-29830 A, for example, discloses a lens shutter having seven throttle blades.

Figure 5:
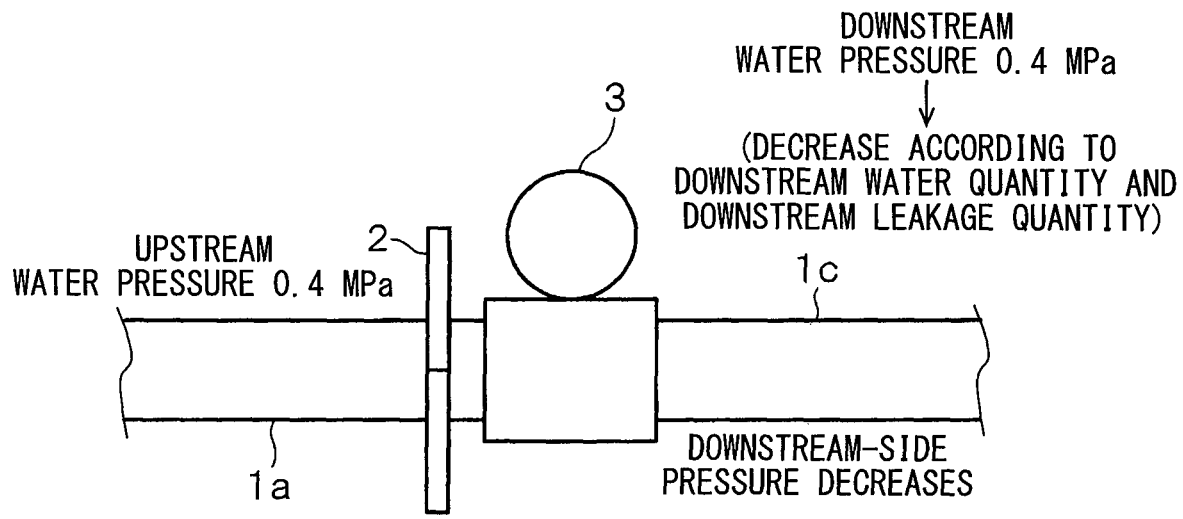
FIG. 5 is a diagram illustrating principles of water leakage detection when the solenoid valve is in a fully-closed state.
Figure 6:
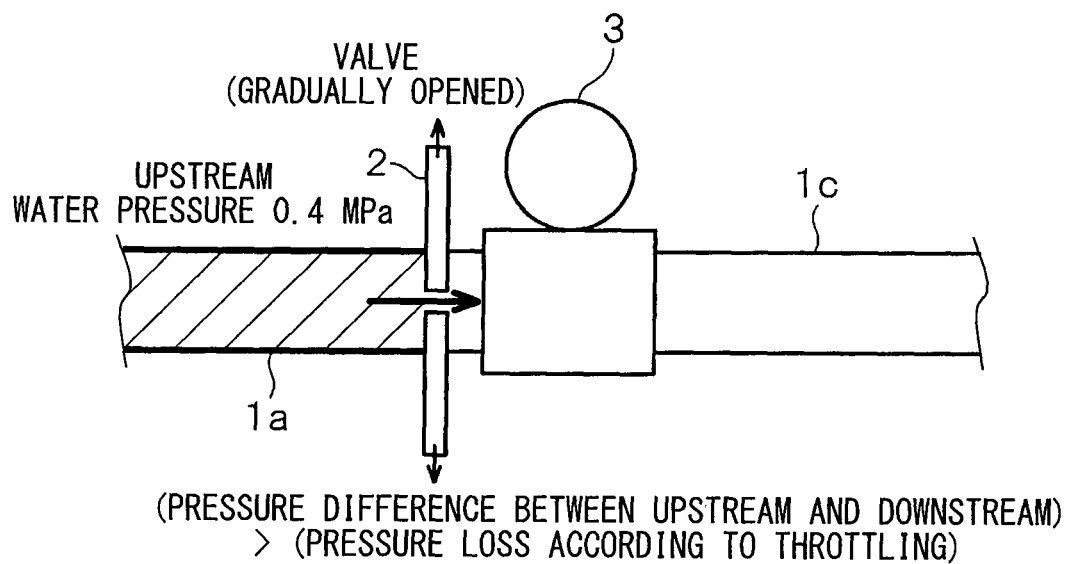
FIG. 6 is a diagram illustrating principles of water leakage detection when the solenoid valve is in a partially-opened state.

Next, principles of the water leakage detection will be described. As described above, an end portion of the water pipe 1c on the downstream side from the flow meter 3 is blocked by the feed-water valve when water is not used. Therefore, when the water pipe 1c has no problem, a water pressure on the side of the water pipe 1c may not decrease even when the solenoid valve 2 is in the fully-closed state. On the other hand, as illustrated in FIG. 5, when water leakage occurs in the water pipe 1c when the solenoid valve 2 is in the fully-closed state, the water pressure on the side of the water pipe 1c decreases over time. Then, when the solenoid valve 2 is gradually opened in a state in which the water pressure has decreased down to a certain level, a water stream from the upstream side to the downstream side is generated when a pressure difference between upstream and downstream exceeds a pressure loss according to the degree of opening of the solenoid valve 2. An occurrence of water leakage is detected by detection of the flow rate at this time by the flow meter 3.

Figure 4:
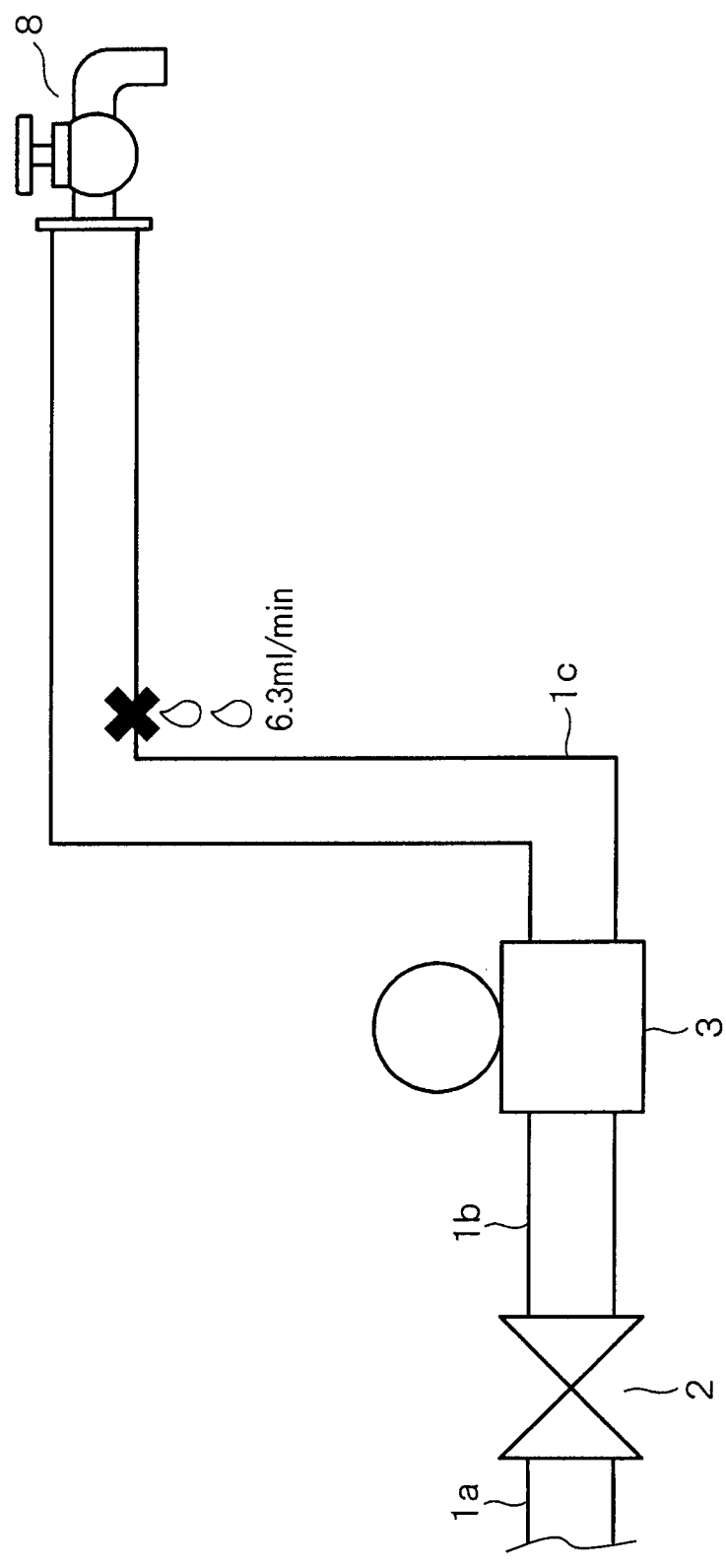
FIG. 4 is a diagram illustrating a state in which water leakage occurs.

Examples of specific values are shown in the following. As an example, it is supposed that an inner diameter d1 of the water pipe 1 is 25.7 mm, which corresponds to a diameter of a 1-inch pipe, and that water leakage at a minute level on the order of 0.1 gallon/h, which corresponds to about 6.3 mml/min occurs in the water pipe 1c as illustrated in FIG. 4. A rate of flow v1 when the flow channel is in the fully-opened state is supposed to be 1000 mml/min. It is supposed that a cross-sectional area of the flow channel in the fully-opened state is A1, a rate of flow when the water leakage occurs is v2, and a corresponding flow channel cross-sectional area is A2. The following relation is established based on an equation of continuity:

$$A1 \cdot v1 = A2 \cdot v2$$

Further, as an expression $A2/A1 = v1/v2 = 6.3/1000 = 0.0063$ is established, a flow channel diameter d2 corresponding to the flow channel cross-sectional area A2 is:

$$d2 = d1\sqrt{(0.0063)} \approx 2.0 \text{ (mm)}.$$

Here, a pressure loss $\Delta P$ when a differential pressure (P1−P2) is produced according to the degree of opening (also referred to as a throttling) of the flow channel expressed by the following, where an area ratio A2/A1 corresponds to a ratio $\beta$ of the degree of opening:

$$\Delta P = (P1-P2)(1-\beta^2).$$

Specifically, the flow channel diameter d2 represents a minimum opening diameter for detecting water leakage at 6.3 mml/min by the flow meter 3. In other words, the solenoid valve 2 is opened from the fully-closed state, and when the opening diameter exceeds 2.0 mm, the flow meter 3 is able to detect water leakage at 6.3 mml/min. The ratio of the degree of opening may be referred to as a throttling ratio.

Therefore, an opening area set for the solenoid valve 2 in the partially-opened state, as compared to that in the fully-opened state, may be set to an area that is sufficiently small to produce a detectable rate of flow according to an amount of water leakage to be detected, setting of a predetermined time period, and performance of the flow meter 3 to be used.

Figure 3:
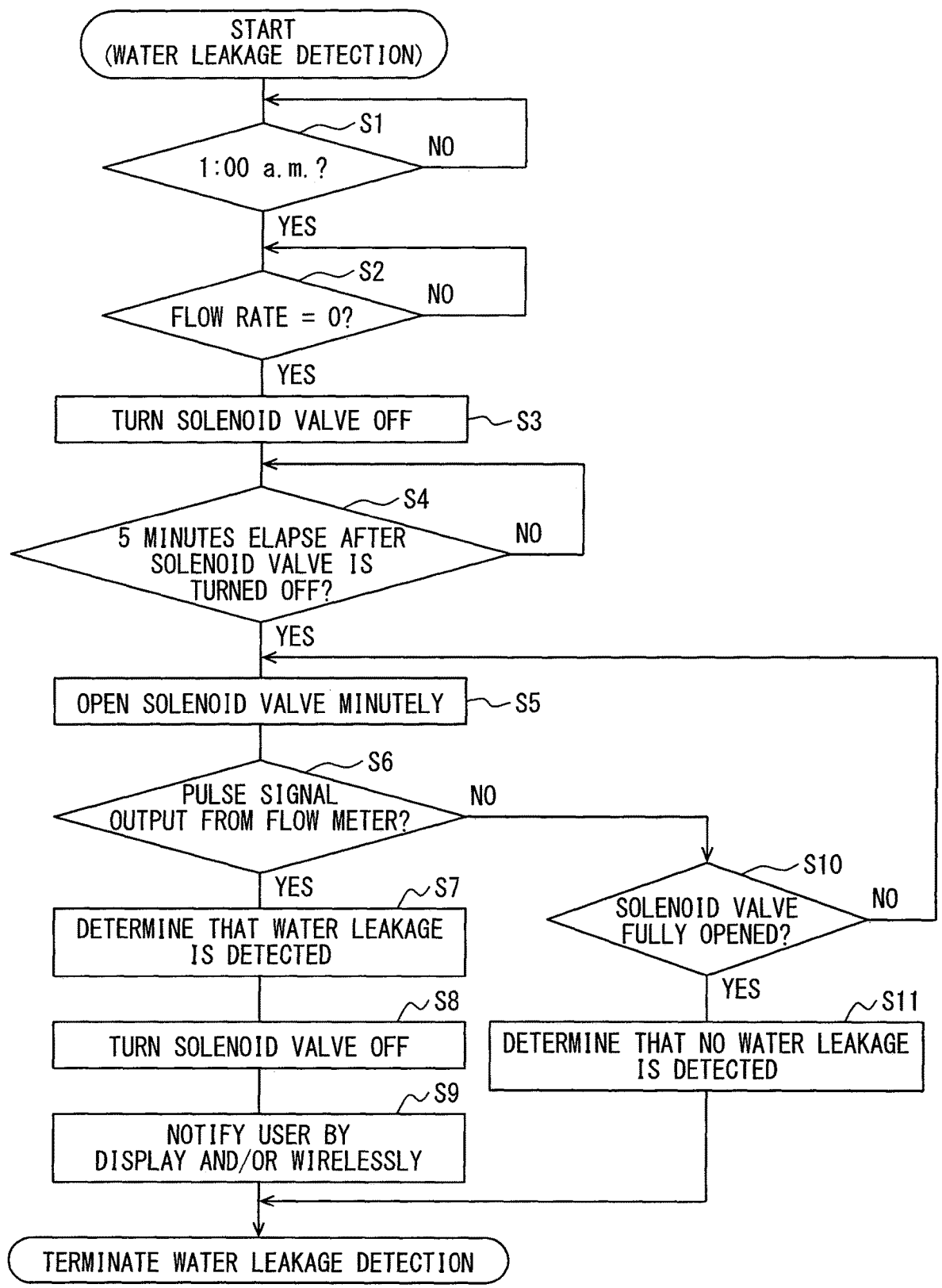
FIG. 3 is a flowchart showing a leakage detection process by a controller.

FIG. 3 is a flowchart showing a process by the controller 4. Initially, the solenoid valve 2 is in the fully-closed state. First, the controller 4 determines whether it is 1:00 a.m. referring to time information of the RTC 5 (S1). It is assumed that the user goes to bed at this time, and will not use water after that. Specifically, when water leakage detection is performed, the solenoid valve 2 is required to be in the fully-closed state for a predetermined time period. Therefore, it may be preferable to perform water leakage detection during a time period in which the user unlikely uses water, such as night-time. Therefore, by starting water leakage detection at the set time, it may be possible to prevent water use by the user from being interrupted. For example, this time may be arbitrarily set by the user by providing a user interface functionality for the display device 6 and the smartphone.

When it is 1:00 a.m. (S1: YES), the controller 4 determines whether the flow rate is "0" (S2). When the flow meter 3 does not output a pulse signal within a predetermined monitoring time and the flow rate is "0" (S2: YES), the solenoid valve 2 is turned OFF, that is, to the fully-closed state (S3). After this time point, the controller 4 waits for 5 minutes, for example (S4).

Here, it is supposed that a normal water pressure within the water pipe 1 is normally 0.4 MPa, for example. Then, as described above, when water leakage occurs on the side of the water pipe 1c when the solenoid valve 2 is turned to the fully-closed state, the water pressure on the downstream side decreases over time. When a flow rate according to the differential pressure between upstream and downstream is produced when the solenoid valve 2 is slightly opened in the state in which the water pressure has decreased down to a certain level, the flow meter 3 outputs a pulse signal, and thus water leakage is detected.

As illustrated in FIG. 3, upon elapse of 5 minutes (S4: YES), the controller 4 slightly opens the solenoid valve 2 by a single stage (S5), and determines whether the flow meter 3 has output a pulse signal (S6). When the flow meter 3 has not output a pulse signal (S6: NO), the controller 4 determines whether the solenoid valve 2 is in the fully-opened state (S10). When the solenoid valve 2 is not in the fully-opened state (S10: NO), the process returns to S5, and the controller 4 opens the solenoid valve 2 by another single stage. When the solenoid valve 2 is turned to the fully-opened state straight (S10: YES), the controller 4 determines that there is no water leakage (S11), and terminates the water leakage detection.

On the other hand, when the flow meter 3 outputs a pulse signal during a loop of S5, S6, and S10 (S6: YES), water leakage is detected (S7), and the controller 4 turns the solenoid valve 2 OFF (S8). Thereafter, the controller 4 causes the display device 6 to indicate the detection of water leakage, and wirelessly notifies the user's smartphone of the detection (S9). Then, the water leakage detection process is terminated.

As described above, according to the present embodiment, the water pipe 1 is provided with the solenoid valve 2 that may be set to one or more stages of the partially-opened state between the fully-closed state and the fully-opened state, and the controller 4 controls the opening/closing state of the solenoid valve 2. Then, the controller 4 turns the solenoid valve 2 to the fully-closed state, and detects water leakage in the water pipe 1 upon detection of a flow rate by the flow meter 3 disposed on the downstream side of the solenoid valve 2 when the solenoid valve 2 is set to the partially-opened state at a time point when a predetermined time elapses.

According to this configuration, when the solenoid valve 2 is set to the partially-opened state, the flow meter 3 only has to detect a flow rate produced according to a difference in water pressure between upstream and downstream, and no expensive high-accuracy flow meter is required. Specifically, a difference in water pressure due to minute water leakage is considerably small, and the rate of flow does not increase even when the solenoid valve 2 is turned to the fully-opened state as in normal times. Therefore, it is difficult for a common flow meter 3 to detect such a flow rate. By contrast, by setting the solenoid valve 2 to the partially-opened state whose opening area is smaller than that in the fully-opened state, a high rate of flow may be produced even with a small difference in water pressure. It may be possible that the flow meter 3 detects a flow rate, that is, water leakage. Therefore, it may be possible to configure a system capable of detecting water leakage at a minute level at low costs.

Further, as the controller 4 includes the RTC 5, and turns the solenoid valve 2 to the fully-closed state to start water leakage detection at a set time, it may be possible to prevent water use by the user from being interrupted. Moreover, the solenoid valve 2 is configured such that the central portion of the water pipe 1 at which the rate of flow is highest becomes the partially-opened state. Specifically, as the solenoid valve 2 is configured to block the water pipe 1 by moving the multiple shut-off valves 7 from the peripheral portion toward the central portion of the water pipe 1 to narrow the water pipe 1, it may be possible to detect water leakage promptly.

Furthermore, the controller 4 determines whether the flow meter 3 has detected a flow rate every time when the partially-opened state of the solenoid valve 2 is changed by a single stage, and finally turns the solenoid valve 2 to the fully-opened state. Therefore, it may be possible to detect water leakage when detection becomes possible while the degree of opening of the solenoid valve 2 is increased stage by stage, without accurately adjusting a relation between a minimum flow rate of water leakage to be detected and the partially-opened state of the solenoid valve 2 previously.

Second Embodiment

Figure 7:
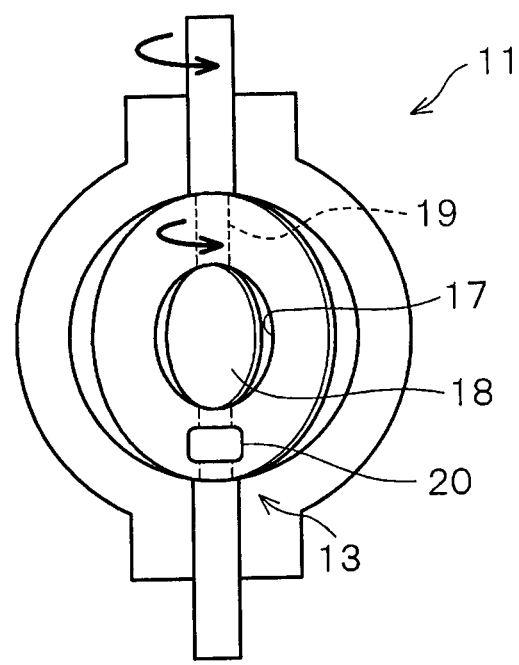
FIG. 7 is a front view illustrating a configuration of a solenoid valve according to a second embodiment.
Figure 8:
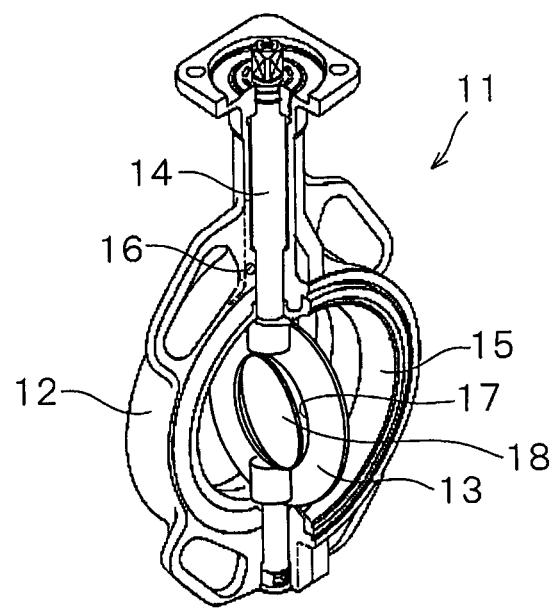
FIG. 8 is a perspective view illustrating a configuration of the solenoid valve.

The same portions and components as in the first embodiment are denoted by the same reference numerals and description thereof is omitted, and different portions and components will be described. As illustrated in FIG. 7 and FIG. 8, in a second embodiment, a solenoid valve 11 having a butterfly valve structure is employed, in place of the solenoid valve 2. As illustrated in FIG. 8, the solenoid valve 11 is provided with a large disk 13 having a disk shape disposed within a body 12 having a substantially annular shape. An upper end and a lower end of the large disk 13 are attached to a stem 14.

The stem 14 is rotatable by an actuator, such as a motor, that is disposed on the side of an upper end or a lower end of the stem 14 but not shown. When an angle (referred to as an opening angle) of a plane of the large disk 13 with respect to a direction of a flow channel in the solenoid valve 11 is 0 degrees, the solenoid valve 11 becomes the fully-closed state. In other words, when an angle between a direction perpendicular to the plane of the large disk 13 and the direction of the flow channel in the solenoid valve 11 is 0 degrees, the solenoid valve 11 is in the fully-closed state. When the opening angle is 90 degrees, the solenoid valve 11 becomes the fully-opened state. An inner peripheral surface of an annular portion of the body 12 is provided with a seat 15 that blocks a gap with the large disk 13 in the fully-closed state. Further, an O ring 16 is disposed at a portion that faces the annular portion on an inner peripheral surface of a portion of the body 12 where the stem 14 is provided.

Further, an opening 17 is provided in a central portion of the large disk 13, and a small disk 18 is provided in order to block the opening 17. A mechanism that the small disk 18 blocks the opening 17 is substantially similar to a blocking mechanism of the large disk 13. An upper end and a lower end of the small disk 18 are attached to a stem 19, and the stem 19 is inserted through the large disk 13. An actuator 20 is disposed on the side of the lower end of the stem 19, and the small disk 18 opens and closes the opening 17 by the stem 19 being rotated by the actuator 20.

The solenoid valve 11 is able to set the partially-opened state by setting the opening angle between 0 degrees and 90 degrees by rotating the large disk 13 in a state in which the small disk 18 blocks the opening 17. However, by setting an opening angle of the small disk 18 to 90 degrees in a state in which the opening angle of the large disk 13 is 0 degrees, the central portion of the water pipe 1 may be set to the partially-opened state similarly to the solenoid valve 2 of the first embodiment.

The present disclosure is not limited to the embodiments described above or illustrated in the drawings, and may be modified or expanded in the following manner.

The number of feed-water valves as exemplified by the faucet 8 may be one or more.

Only one stage of the partially-opened state of the solenoid valve may be sufficient.

The process for water leakage detection is not always required to start at the set time.

Specific values for the water pressure, the amount of water leakage to be detected, the predetermined time period, and the diameter of the water pipe may be altered as needed according to a particular design.

According to a water leakage detection system of the present disclosure, a water pipe is provided with a solenoid valve configured to be set to one or more stages of a partially-opened state between a fully-closed state and a fully-opened state, and a controller controls an opening/closing state of the solenoid valve. The controller detects water leakage in the water pipe when a flow meter disposed on a downstream side of the solenoid valve detects a flow rate when the solenoid valve is set to the partially-opened state at a time point when a predetermined time elapses after the solenoid valve is turned to the fully-closed state.

When water leakage occurs in the water pipe on the downstream side from the solenoid valve when the solenoid valve is turned to the fully-closed state, the water pressure on the downstream side gradually decreases over time. Therefore, after elapse of the predetermined time, a predetermined difference in water pressure is produced between the upstream side and the downstream side. Thus, when the controller sets the solenoid valve to the partially-opened state at a time point when a predetermined time elapses after the controller turns the solenoid valve to the fully-closed state, a water stream from the upstream side to the downstream side is produced due to the difference in water pressure. Then, the controller may detect water leakage in the water pipe, as the flow meter detects the flow rate.

According this configuration, when the solenoid valve is set to the partially-opened state, the flow meter only has to detect a flow rate produced according to a difference in water pressure between upstream and downstream, and no expensive high-accuracy flow meter is required. Therefore, it may be possible to configure a system capable of detecting water leakage at a minute level at low costs.

Specifically, a difference in water pressure due to minute water leakage is considerably small, and the rate of flow does not increase even when the solenoid valve is turned to the fully-opened state as in normal times. Therefore, it is difficult for a common flow meter to detect such a flow rate. By contrast, by setting the solenoid valve to the partially-opened state whose opening area is smaller than that in the fully-opened state as described above, a high rate of flow may be produced even with a small difference in water pressure. It may be possible that the common flow meter to detect a flow rate, that is, water leakage.

Further, according to the water leakage detection system of the present disclosure, the solenoid valve may turn a central portion of the water pipe to the partially-opened state. Specifically, as the rate of water flow within the water pipe is highest at the central portion of the water pipe, it may be possible to detect water leakage promptly by turning the central portion to the partially-opened state.

According to the water leakage detection system of the present disclosure, the solenoid valve may block the water pipe by moving multiple shut-off valves from a peripheral portion toward a central portion of the water pipe to narrow the water pipe. Specifically, the central portion of the water pipe may be turned to the partially-opened state by multiple shut-off valves that constitute the solenoid valve moving in a manner similar to a throttle mechanism of a lens shutter of a camera, for example.

According to the water leakage detection system of the present disclosure, the controller may have a clock function, and turn the solenoid valve to the fully-closed state to start the water leakage detection at a set time. Specifically, when water leakage detection is performed, the solenoid valve is turned to the fully-closed state for a predetermined time period. Therefore, it may be preferable to perform water leakage detection during a time period in which the user unlikely uses water, such as night-time. Therefore, by starting water leakage detection at the set time, it may be possible to prevent water use by the user from being interrupted.

According to the water leakage detection system of the present disclosure, the solenoid valve may be set to multiple stages of the partially-opened state, and the controller may determine whether the flow meter has detected a flow rate every time when the partially-opened state of the solenoid valve is changed by a single stage, and finally turn the solenoid valve to the fully-opened state. With this configuration, it is possible to detect water leakage when detection becomes possible while the degree of opening of the solenoid valve is increased stage by stage, without accurately adjusting a relation between a minimum flow rate of water leakage to be detected and the partially-opened state of the solenoid valve previously.

It is noted that a flowchart or the process of the flowchart in the present application includes steps (also referred to as sections), each of which is represented, for instance, as S1. Further, each step can be divided into several sub-steps while several steps can be combined into a single step.

While the embodiments, the configurations, the aspects of water leakage detection system have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A water leakage detection system, comprising:
   a solenoid valve that is provided to a water pipe having at least one feed-water valve on a downstream portion of the water pipe, and is configured to be set to at least one stage of a partially-opened state between a fully-closed state and a fully-opened state;
   a flow meter that is disposed on a downstream side of the solenoid valve; and
   a controller that controls an opening/closing state of the solenoid valve, and receives information on a flow rate detected by the flow meter,
   wherein:
   the controller detects water leakage in the water pipe when the solenoid valve is turned to the fully-closed state, and thereafter when the solenoid valve is set to the partially-opened state at a time point when a predetermined time elapses, and thereafter when the flow meter detects a flow rate,
   the solenoid valve is configured to open the water pipe to the partially-opened state at a central portion of the water pipe, and the solenoid valve is configured to open the central portion of the water pipe before a peripheral portion of the water pipe.

2. The water leakage detection system according to claim 1, wherein:
the solenoid valve is configured to open the water pipe to the partially-opened state from the central portion toward a peripheral portion of the water pipe.

3. The water leakage detection system according to claim 1, wherein:
the controller has a clock function, and turns the solenoid valve to the fully-closed state at a predetermined time.

4. The water leakage detection system according to claim 1, wherein:
the solenoid valve opens only the central portion of the water pipe in the partially-opened state.

5. A water leakage detection system, comprising:
a solenoid valve that is provided to a water pipe having at least one feed-water valve on a downstream portion of the water pipe, and is configured to be set to at least one stage of a partially-opened state between a fully-closed state and a fully-opened state;
a flow meter that is disposed on a downstream side of the solenoid valve; and
a controller that controls an opening/closing state of the solenoid valve, and receives information on a flow rate detected by the flow meter,
wherein:
the controller detects water leakage in the water pipe when the solenoid valve is turned to the fully-closed state, and thereafter when the solenoid valve is set to the partially-opened state at a time point when a predetermined time elapses, and thereafter when the flow meter detects a flow rate,
the solenoid valve has a plurality of shut-off members, and
the plurality of shut-off members of the solenoid valve move from a peripheral portion of the water pipe toward a central portion of the water pipe so as to narrow the water pipe, causing the solenoid valve to block the water pipe.

6. The water leakage detection system according to claim 5, wherein:
the solenoid valve is configured to open the water pipe to the partially-opened state at a central portion of the water pipe.

7. The water leakage detection system according to claim 5, wherein:
the controller has a clock function, and turns the solenoid valve to the fully-closed state at a predetermined time.

8. The water leakage detection system according to claim 5, wherein:
the solenoid valve is configured to be set to a plurality of stages of the partially-opened state; and
the controller determines whether the flow meter has detected a flow rate every time when the partially-opened state of the solenoid valve is changed by a single stage, and finally turns the solenoid valve to the fully-opened state.

9. A water leakage detection system, comprising:
a solenoid valve that is provided to a water pipe having at least one feed-water valve on a downstream portion of the water pipe, and is configured to be set to at least one stage of a partially-opened state between a fully-closed state and a fully-opened state;
a flow meter that is disposed on a downstream side of the solenoid valve; and
a controller that controls an opening/closing state of the solenoid valve, and receives information on a flow rate detected by the flow meter,
wherein:
the controller detects water leakage in the water pipe when the solenoid valve is turned to the fully-closed state, and thereafter when the solenoid valve is set to the partially-opened state at a time point when a predetermined time elapses, and thereafter when the flow meter detects a flow rate,
the solenoid valve is configured to be set to a plurality of stages of the partially-opened state, and
the controller determines whether the flow meter has detected a flow rate every time when the partially-opened state of the solenoid valve is changed by a single stage, and finally turns the solenoid valve to the fully-opened state.

10. The water leakage detection system according to claim 9, wherein:
the solenoid valve is configured to open the water pipe to the partially-opened state at a central portion of the water pipe.

11. The water leakage detection system according to claim 9, wherein:
the controller has a clock function, and turns the solenoid valve to the fully-closed state at a predetermined time.

* * * * *